United States Patent
Talja

(10) Patent No.: US 9,045,055 B2
(45) Date of Patent: Jun. 2, 2015

(54) PREVENTING OF SLIP IN AN ELECTRICALLY POWERED VEHICLE

(71) Applicant: ABB Oy, Helsinki (FI)

(72) Inventor: Markku Talja, Järvenpää (FI)

(73) Assignee: ABB OY, Helsinki (FI)

(*) Notice: Subject to any disclaimer, the term of this patent is extended or adjusted under 35 U.S.C. 154(b) by 0 days.

(21) Appl. No.: 14/253,275

(22) Filed: Apr. 15, 2014

(65) Prior Publication Data

US 2014/0309826 A1    Oct. 16, 2014

(30) Foreign Application Priority Data

Apr. 16, 2013   (EP) ..................................... 13163841

(51) Int. Cl.
  *B60L 15/20*    (2006.01)
  *B60L 3/10*     (2006.01)
  *B60W 10/08*    (2006.01)

(52) U.S. Cl.
  CPC ............... *B60L 15/20* (2013.01); *B60L 3/102* (2013.01); *B60L 3/108* (2013.01); *B60L 15/2036* (2013.01); *B60W 10/08* (2013.01); *B60L 2240/14* (2013.01); *B60L 2240/463* (2013.01)

(58) Field of Classification Search
  USPC .......................................................... 701/22
  See application file for complete search history.

(56) References Cited

U.S. PATENT DOCUMENTS

| | | | | |
|---|---|---|---|---|
| 6,473,683 | B1 * | 10/2002 | Nada ............................... | 701/82 |
| RE39,183 | E  * | 7/2006  | Nada ............................... | 701/82 |
| 7,230,393 | B2 * | 6/2007  | Hommi et al. ................... | 318/52 |
| 2001/0032046 | A1 * | 10/2001 | Nada ............................... | 701/82 |
| 2005/0228546 | A1 | 10/2005 | Naik et al. | |
| 2006/0237244 | A1 | 10/2006 | Hommi | |
| 2012/0279793 | A1 | 11/2012 | Kikuchi et al. | |
| 2014/0326525 | A1 * | 11/2014 | Doerksen ....................... | 180/181 |

FOREIGN PATENT DOCUMENTS

| | | |
|---|---|---|
| DE | 10 2006 013 381 A1 | 9/2007 |
| EP | 2 527 190 A1 | 11/2012 |
| WO | WO 2005/012026 A1 | 2/2005 |

OTHER PUBLICATIONS

European Search Report dated Sep. 10, 2013.

* cited by examiner

*Primary Examiner* — Thomas Tarcza
*Assistant Examiner* — Alex C Dunn
(74) *Attorney, Agent, or Firm* — Buchanan Ingersoll & Rooney PC

(57) ABSTRACT

A method and arrangement for preventing slip in a wheeled vehicle having two or more driving wheels that are operated with electric motors. The motor of each driving wheel includes a torque limit applicable to limit torque of the motor. For each driving wheel, the method includes setting an angular acceleration limit for the wheel, detecting angular acceleration of the driving wheel continuously, comparing the detected angular acceleration with the angular acceleration limit continuously, if the detected angular acceleration is higher than the angular acceleration limit, reducing the torque limit from its current value until the angular acceleration of the wheel is below the angular acceleration limit, increasing the torque limit at a first rate to a value lower than the value from which it was reduced, and increasing the torque limit at a second rate to the maximum value, the second rate being lower than the first rate.

11 Claims, 3 Drawing Sheets

Legend:
1 – speed controller        ω – angular speed
2 – torque controller       $ω_{ref}$ – angular speed reference
3 – modulator               $V_{ref}$ – speed reference
4 – inverter                T – torque
5 – estimator               u – voltage of motor
M – motor                   i – current of motor

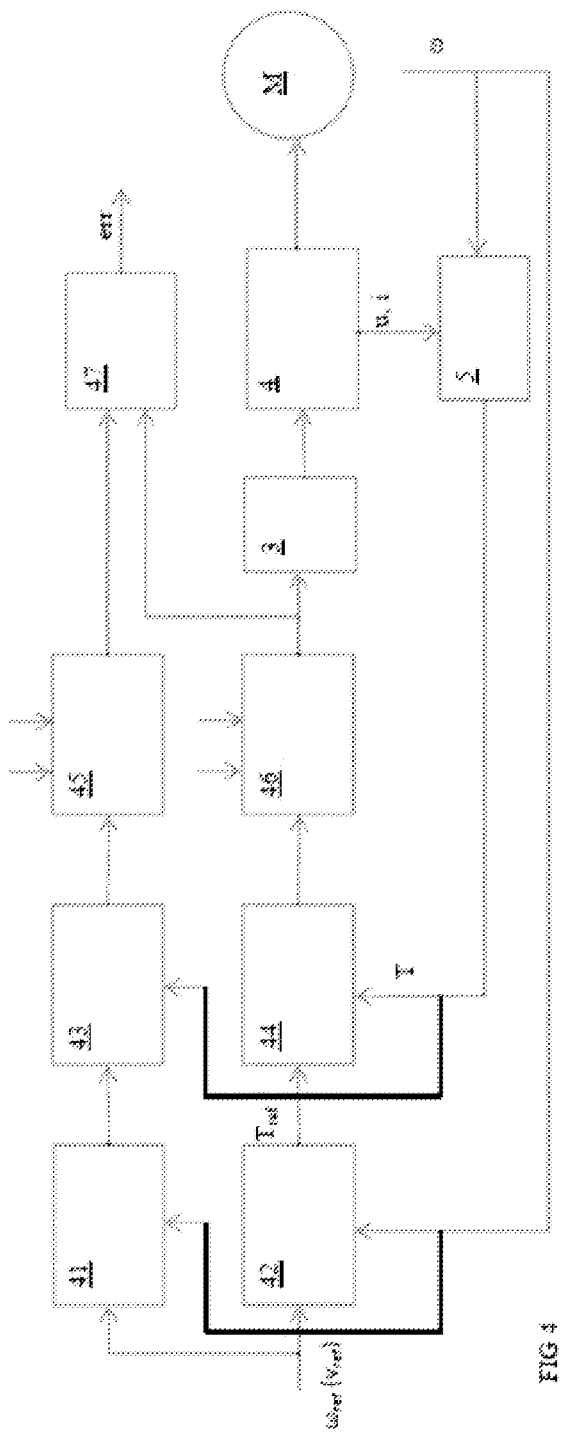

FIG 3

Legend:
3 – modulator
4 – inverter
5 – estimator
41, 42 – speed control processing components
43, 44 – torque control processing components
45, 46 – torque limiter processing components
47 – comparison processing component
M - motor $\omega$ – angular speed
$\omega_{ref}$ – angular speed reference
$V_{ref}$ – speed reference
$T$ – torque
$T_{ref}$ – torque reference
$u$ – voltage of motor
$i$ – current of motor
err – signal

PREVENTING OF SLIP IN AN ELECTRICALLY POWERED VEHICLE

RELATED APPLICATIONS

This application claims priority under 35 U.S.C. §119 to European Patent Application No. 13163841.3 filed in Europe on Apr. 16, 2013, the entire content of which is hereby incorporated by reference in its entirety.

FIELD

The present disclosure relates to preventing of slip, and more particularly to preventing of slip in a vehicle having electrically driven wheels.

BACKGROUND

It is known that driving conditions vary due to different road surfaces and weather conditions. Roads may get wet, snowy and icy, and thereby the grip under the wheels of a vehicle changes. For the purpose of keeping traction and braking force at their maximum, torque applied to the wheels should be adapted to be as close as possible to the value depending on the weather conditions.

It is a known problem in wheeled vehicles that wheels of the vehicles may lose grip on the surface. Loss of grip may occur during acceleration of the vehicle or during deceleration of the vehicle. When the wheels are slipping during acceleration, the body speed of the vehicle does not increase together with the increasing rotational speed of the wheels. In some cases, control that prevents wheels from losing grip when accelerating is referred to as traction control.

In deceleration or braking of a vehicle, slip occurs when the wheels of the vehicle lose grip on the surface and rotate slower than the body speed. This may lead to a situation in which the wheels are locked and the vehicle still moves. In vehicles, control that prevents slip during deceleration is referred to as an ABS system ("Antiblockiersystem" or "antilock braking system"). This system effectively keeps the wheels in rotation during braking and maintains the grip between the wheel and the surface, enabling the steering of the vehicle even during heavy deceleration.

In electrically powered vehicles, each driving wheel may include its own electric motor and corresponding systems for driving the motor. The system for driving the motor may include an inverter, which produces an alternating voltage from a DC voltage source of the vehicle and supplies it to the motor. As is known, inverters can control electric motors precisely, and torque produced by the motor can be controlled.

In known electrically driven wheeled vehicles, preventing of slip is carried out by limiting the torque when slip is detected, and then returning the torque back to its original value. This may lead to a repetitive decrease and increase of torque, and the optimal accelerating or braking force may not be reached.

SUMMARY

An exemplary embodiment of the present disclosure provides a method for preventing slip in a wheeled vehicle having two or more driving wheels that are respectively operated with electric motors. The electric motor of each driving wheel of the vehicle includes a torque limit applicable to limit torque of the corresponding motor, respectively. For each driving wheel, the method includes setting an angular acceleration limit for the driving wheel, detecting angular acceleration of the driving wheel continuously, and comparing the detected angular acceleration with the angular acceleration limit continuously. If the detected angular acceleration is higher than the angular acceleration limit, the method includes reducing the torque limit from its current value until the angular acceleration of the driving wheel is below the angular acceleration limit. The method also includes increasing the torque limit at a first rate to a value lower than the value from which the torque limit was reduced. In addition, the method includes increasing the torque limit at a second rate to the maximum value, where the second rate is lower than the first rate.

An exemplary embodiment of the present disclosure provides an arrangement for preventing slip in a wheeled vehicle having two or more driving wheels that are respectively operated with electric motors. The electric motor of each driving wheel of the vehicle includes a torque limit applicable to limit torque of the corresponding motor. For each driving wheel, the arrangement includes means for setting an angular acceleration limit for the driving wheel, means for continuously detecting angular acceleration of the driving wheel, and means for continuously comparing the detected angular acceleration with the angular acceleration limit. The arrangement also includes means for reducing the torque limit, if the detected angular acceleration is higher than the angular acceleration limit, from the current value of the torque limit until the angular acceleration of the driving wheel is below the angular acceleration limit. In addition, the arrangement includes means for increasing the torque limit at a first rate to a value lower than the value from which it was reduced, and means for increasing the torque limit at a second rate to the maximum value, where the second rate is lower than the first rate.

BRIEF DESCRIPTION OF THE DRAWINGS

Additional refinements, advantages and features of the present disclosure are described in more detail below with reference to exemplary embodiments illustrated in the drawings, in which:

FIG. 4 shows parallel control blocks for fail-safe operation according to an exemplary embodiment of the present disclosure.

DETAILED DESCRIPTION

Exemplary embodiments of the present disclosure provide a method and an arrangement for preventing slip in a wheeled vehicle having two or more driving wheels that are operated with electric motors.

Exemplary embodiments of the present disclosure are on the idea of adapting the torque of one or more of the driving wheels to the prevailing conditions when slip is detected.

As torque is adapted to the conditions, the torque of the driving wheel is not raised to the maximum possible value after lowering the torque when slip is detected. In accordance with an exemplary embodiment of the present disclosure, the torque is raised to a lower value than the value from which the torque was reduced. That is to say, the maximum value of torque is limited after detection of slip. In case slip is detected again, then the torque is reduced again until the acceleration of the wheel is within allowable limits. Again, the torque limit is increased, but still to a lower value than the value from which it was reduced. This procedure is continued and the maximum torque is reduced so that the operation of the wheel (s) adapts to the prevailing conditions.

When the torque is increased to a lower value than the maximum value of the torque, the torque is slowly increased further towards its maximum value. Thus, after the increase of the torque limit to a lower value than the maximum value, the torque is increased further towards the maximum value but with a lower increase rate.

An advantage of the method and arrangement of the present disclosure is that an optimal amount of torque is available so that the acceleration and deceleration of a vehicle can be carried out as efficiently as possible.

In accordance with an exemplary embodiment of the present disclosure, a vehicle is driven with two or more separate wheels. Thus, each driving wheel includes a motor for rotating the wheel. The motor is fed with a power converter which may include an inverter connected to a DC voltage source of the vehicle.

Figure 1:
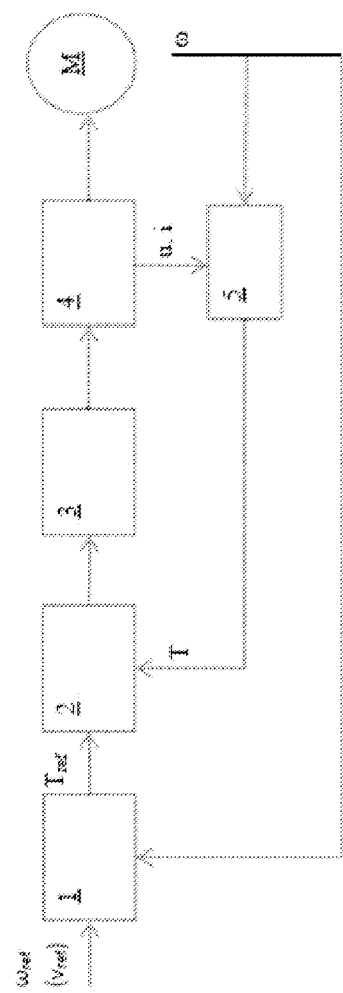
FIG. 1 shows a simplified control structure.

FIG. 1 shows a simplified known controller structure for driving the motor that rotates the wheel. In this controller structure, a speed command or reference $v_{ref}$ is given to the motor. The speed reference is given by the user of the vehicle either directly or via some processing circuits. The speed reference is compared with the actual speed v of the vehicle in a speed controller 1. A torque reference $T_{ref}$ from the speed controller 1 is outputted to a torque controller 2 which also receives an estimated value of torque T. The output of the torque controller 2 is further processed and led to a modulator 3 which gives the control signals to the controlled semiconductor switches of an inverter 4. The processing of the output of the torque controller 2 may include controlling the currents of the inverter. Further, the currents i and voltages u of the motor and the rotational speed ω of the motor are measured or estimated, and the torque T is estimated and used in the controllers. In FIG. 1, the torque of the motor is estimated in an estimation block 5. In the estimation, a motor model together with the measurements are used for obtaining a value representing the torque T. It is shown in FIG. 1 that the speed controller may receive an angular speed reference or a speed reference. It is known that once the radius of a rotating wheel is known, the angular speed can be calculated from the linear speed and vice versa.

In known methods of avoiding slip, torque is limited until the acceleration of the slipping wheel is at an acceptable level. When this level is reached, the limitation of torque is removed, and the whole torque range is in use again.

In accordance with an exemplary embodiment of the present disclosure, each driving wheel includes an angular acceleration limit $d\omega/dt_{lim}$ and a torque limit $T_{lim}$ for limiting the torque applied to the motors driving the wheels, respectively. Further, the angular acceleration of each driving wheel is detected continuously.

Figure 2:
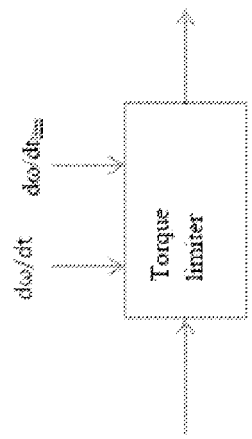
FIG. 2 shows an example of a torque limiter according to an exemplary embodiment of the present disclosure.

If the angular acceleration of a driving wheel exceeds the set limit, the torque limit of the motor relating to that wheel is quickly reduced until the acceleration has dropped below the set limit. FIG. 2 shows a torque limiting system that is connected to the output of the torque controller. In accordance with an exemplary embodiment of the present disclosure, the torque limiter of FIG. 2 is added after the torque controller 2 of FIG. 1. The output of the torque limiter is connected as the output of the torque controller 2 of FIG. 1. The torque limit is reduced with a fast ramp such that the angular acceleration is determined during the decrease of the torque limit.

In accordance with an exemplary embodiment, the torque limiter receives the angular acceleration of the wheel. Once the torque limiter detects that the angular acceleration is above a set limit, the torque limiter reduces the output of the torque controller. The angular acceleration is constantly determined, and while it is above the set limit, the torque is reduced. When the angular acceleration finally goes below the limit, the torque limit is increased. The limit is not increased to its maximum value but to a value that is lower than the torque limit at which the slip was detected. Thus, if slip was detected when the torque limit was at the maximum torque, the torque limit is increased to a value lower than the maximum value. If, however, slip is detected again when the torque is limited, then the torque is lowered again. This operation is continued and, in this manner, the torque limit is adapted to the prevailing conditions.

The increase of the torque limit to a lower value than the original value may be carried out stepwise or using a similar ramp as in the lowering of the torque limit.

After the torque limit is reduced and raised up to a lower value, the torque limit is slowly brought back up to the original limit value unless slip is detected again. Thus, the reduced limit is increased slowly so that when the conditions allow, the full torque is available again.

Figure 3:
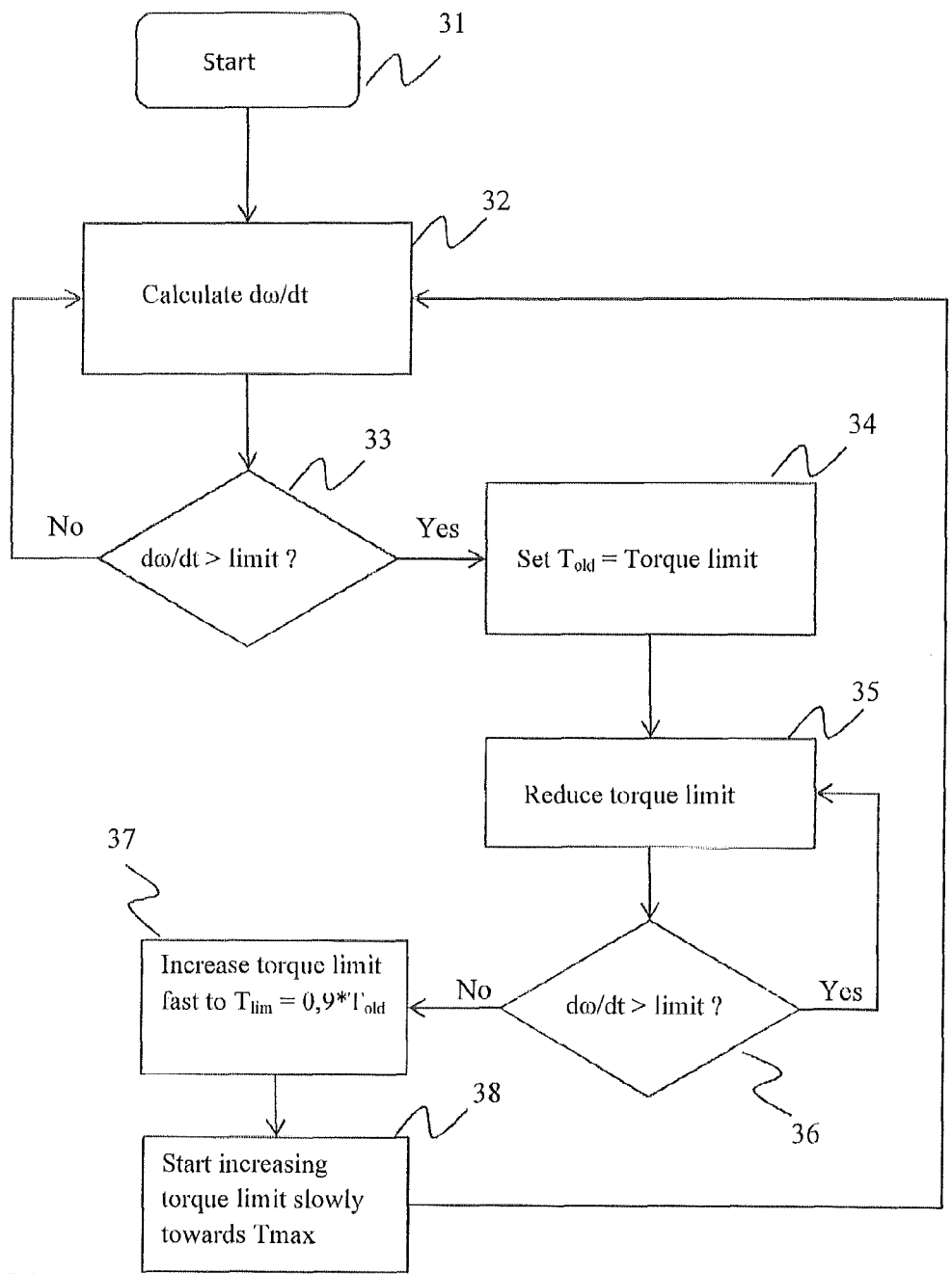
FIG. 3 shows a flowchart of an exemplary embodiment of a method according to the present disclosure.

An exemplary embodiment of a method according to the present disclosure is next described in connection with a flowchart of FIG. 3. The flowchart relates to one driving wheel, i.e. the same operations are carried out for each driving wheel. The procedure is started and is in operation all the time when the vehicle is in operation. The angular acceleration of the wheel is calculated at step 32, and the value of the angular acceleration dω/dt is compared with a set limit at step 33. If the angular acceleration is lower than the limit, the operation continues back to step 32 to determine the angular acceleration again. If the angular acceleration exceeds the set limit, the value of the current torque limit is set at step 34 to a variable $T_{old}$, and the torque limit is lowered to limit the torque. The torque limit is lowered at step 35, and it is checked at step 36 if the angular acceleration has dropped below the limit. The operation is looped in steps 35 and 36 until the angular acceleration is below the set limit, after which the torque limit is increased to a certain fraction of the torque limit $T_{old}$ at the time of the slip. In the illustrated example, the torque limit is set to 0.9 of the previous torque limit ($T_{lim}=0.9*T_{old}$).

After the new torque limit is set, the increase of the torque limit towards the maximum value of the torque limit is started at step 38. This increase is carried out at a lower pace than the first increase of the limit in step 37. As an example, the value of the torque limit may be raised five times slower back towards the original value than the first increase. However, the torque limit may be raised back to the highest possible value at any other pace that is lower than the increase of the torque limit in step 37.

While the torque limit is increased towards the maximum value, the angular acceleration is continuously calculated at step 32 and compared to the limit in step 33. In case a slip is detected again, the operation is continued as described above, and in step 34, the value of the torque limit when the slip occurred is stored as the value $T_{old}$. When the surface is slippery, the torque limit is continuously lowered when the flowchart is looped until the torque limit reaches a value at which the produced torque causes the wheels to slip. In this way, torque obtainable from the motor is adapted to the prevailing conditions.

In accelerating a vehicle, such as a car, slip of the wheel means that the circumferential speed of the wheel is higher than the body speed of the vehicle. In deceleration, e.g., braking, slip means that the circumferential speed of the wheel is lower than the body speed of the vehicle. As is known, electric motors can be used as brakes. In vehicles driven by electric motors, this is advantageous, since when motors are used as brakes, they generate electrical power, which can be fed back to the electrical energy storage in the vehicle. When decelerating the vehicle electrically, a braking torque is applied to the motors, and the above procedure is applicable to prevent the slip.

Since the motors of a vehicle may operate as brakes, torque limits should be separate for accelerating and decelerating the wheels.

According to an exemplary embodiment, the control loop in the prevention of slip is formed in a doubled manner. Especially during deceleration of the vehicle, it is important that the output from the torque controller is correct. In this embodiment, the controllers of the system are doubled for obtaining an indication of the correct operation of the system. As shown in FIG. 4, the embodiment includes two parallel speed control blocks 41, 42, torque control blocks 43, 44 and torque limiter blocks 45, 46. The blocks 42, 44 and 46 are in the control loop, and the parallel blocks 41, 43 and 45 include the same parameters and inputs as the blocks in the control loop. As the inputs and parameters are the same, the outputs from the torque limiter blocks should correspond to each other. Other elements of FIG. 4 are numbered according to the numbering in FIG. 1. It is to be understood that the structural components of the arrangement illustrated in FIG. 4 are depicted as functional blocks. These blocks depict processing components of the arrangement of the present disclosure. The processing components are implemented as processing circuitry having one or more processors which execute computer-readable instructions and/or a computer program tangibly recorded on one or more non-transitory computer-readable recording media (e.g., ROM, a hard disk drive, flash memory, optical memory or any other type of non-volatile memory). The one or more processors constituted in the processing circuitry for implementing the control blocks illustrated in FIG. 4 may be general-purpose processors and/or application-specific processors specifically designed to carry out the operative functions described herein. As used herein, the term "means", when describing the structural components of the arrangement of the present disclosure, constitutes the processing circuitry as described above for each corresponding control block.

In operation, the doubled controller blocks are fed with the same input signals. A comparison element block 47 is connected to the outputs of the torque limiter blocks. When the comparison element detects that the inputted signals differ from each other, the comparison element 47 outputs a signal err. In response to the signal err being active, the higher level controller takes the mechanical brakes of the vehicle into use for the safety of the operations.

According to an exemplary embodiment, once the system including the controller blocks is started, a different signal is produced to one of the controller blocks. A deviation can be inputted to the input of the speed controller acting as the doubling controller, for example. When different inputs are fed to the system, the comparison element 47 should indicate an error. If an error signal is produced, the starting of the system may be continued normally. If, however, an error signal is not produced, the system is faulty and the starting of the system is aborted.

The above checking of the system, in which an erroneous input is fed to one of the parallel control structures, may be carried out each time the vehicle is started, for example. During the normal operation of the vehicle, the outputs of the torque limiter blocks are compared continuously. As mentioned above, once the comparison element 47 outputs the err signal, a higher level controller takes the mechanical brakes into use.

According to an exemplary embodiment of the present disclosure, the angular acceleration limit is constant. That is to say, the limit stays the same regardless of the speed of the vehicle or any other property of the vehicle. In accordance with another exemplary embodiment, the angular acceleration limit used for reducing the torque limit is variable. The variable angular acceleration limit may depend on the speed of the vehicle, i.e. the body speed. As is known, the effective friction between the wheel and the surface depends on the speed of the vehicle. Therefore, to allow the maximum controllability and torque of the vehicle, the angular acceleration limit is changed on the basis of the speed of the vehicle. The speed of the vehicle is taken into account by storing beforehand angular acceleration limits as a function of speed. Once the system is in use, the applied limit is chosen on the basis of the speed of the vehicle. The speed of the vehicle is generally known in the vehicle and any known way of measuring the body speed is applicable in connection with this embodiment.

The angular acceleration of a wheel can be calculated simply from the angular speed of the wheel or the motor, which is either measured or estimated. The angular acceleration can be calculated as a change of the angular speed in a time unit.

In the above example, the torque limiting is shown as a separate unit or block from the torque controller. It is, however, clear that the torque controller may have a limiter function in the controller structure. Such a structure limits the output of the torque controller to a certain limit once certain conditions are fulfilled. Further, the above controller structure shows a simplified example of a controller suitable for controlling the motors driving the wheels of an electrical vehicle, such as an electric car. The present disclosure limits the torque applied to wheels of a vehicle, and thus a torque signal that can be limited is utilized in the present disclosure. The torque signal may also be in some other form, such as a current affecting the torque of the motor.

It will be obvious to a person skilled in the art that, as the technology advances, the inventive concept can be implemented in various ways. The invention and its embodiments are not limited to the examples described above but may vary within the scope of the claims.

It will therefore be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for preventing slip in a wheeled vehicle having two or more driving wheels that are respectively operated with electric motors, the electric motor of each driving wheel of the vehicle comprising a torque limit applicable to limit torque of the corresponding motor, respectively, wherein the method comprises, for each driving wheel:
   setting an angular acceleration limit for the driving wheel;
   detecting angular acceleration of the driving wheel continuously;
   comparing the detected angular acceleration with the angular acceleration limit continuously;
   if the detected angular acceleration is higher than the angular acceleration limit, reducing the torque limit from its current value until the angular acceleration of the driving wheel is below the angular acceleration limit;

increasing the torque limit at a first rate to a value lower than the value from which the torque limit was reduced; and increasing the torque limit at a second rate to the maximum value, the second rate being lower than the first rate.

2. A method according to claim 1, comprising:

a control loop having a torque controller, wherein the reducing of the torque limit comprises limiting the output of the torque controller by using a torque limiter.

3. A method according to claim 1, comprising:

determining a body speed of the vehicle; and setting the torque limit on the basis of the body speed of the vehicle.

4. A method according to claim 1, comprising:

producing two torque references by using two parallel circuits from the same inputs, from which one of the torque references is used for controlling the torque limit;

comparing the two torque references; and producing a signal indicating error if the torque references are different.

5. A method according to claim 4, wherein in starting of the vehicle, the method comprises:

producing different input signals to the parallel circuits;

comparing the two torque references; and preventing the use of the vehicle if the two torque references correspond to each other.

6. A method according to claim 2, comprising:

determining a body speed of the vehicle; and setting the torque limit on the basis of the body speed of the vehicle.

7. A method according to claim 6, comprising:

producing two torque references by using two parallel circuits from the same inputs, from which one of the torque references is used for controlling the torque limit;

comparing the two torque references; and producing a signal indicating error if the torque references are different.

8. A method according to claim 7, wherein in starting of the vehicle, the method comprises:

producing different input signals to the parallel circuits;

comparing the two torque references; and preventing the use of the vehicle if the two torque references correspond to each other.

9. A method according to claim 2, comprising:

producing two torque references by using two parallel circuits from the same inputs, from which one of the torque references is used for controlling the torque limit;

comparing the two torque references; and producing a signal indicating error if the torque references are different.

10. A method according to claim 9, wherein in starting of the vehicle, the method comprises:

producing different input signals to the parallel circuits;

comparing the two torque references; and preventing the use of the vehicle if the two torque references correspond to each other.

11. An arrangement for preventing slip in a wheeled vehicle having two or more driving wheels that are respectively operated with electric motors, the electric motor of each driving wheel of the vehicle comprising a torque limit applicable to limit torque of the corresponding motor, the arrangement comprising, for each driving wheel:

means for setting an angular acceleration limit for the driving wheel;

means for continuously detecting angular acceleration of the driving wheel;

means for continuously comparing the detected angular acceleration with the angular acceleration limit;

means for reducing the torque limit, if the detected angular acceleration is higher than the angular acceleration limit, from the current value of the torque limit until the angular acceleration of the driving wheel is below the angular acceleration limit;

means for increasing the torque limit at a first rate to a value lower than the value from which it was reduced; and means for increasing the torque limit at a second rate to the maximum value, the second rate being lower than the first rate.

* * * * *